(12) United States Patent
Mazzer

(10) Patent No.: US 9,737,167 B2
(45) Date of Patent: Aug. 22, 2017

(54) DEVICE FOR PRESSING THE COFFEE POWDER WITHIN THE FILTER HOLDER

(71) Applicant: MAZZER LUIGI S.R.L., Scorze (IT)

(72) Inventor: Giovanni Mazzer, Scorzé (IT)

( * ) Notice: Subject to any disclaimer, the term of this patent is extended or adjusted under 35 U.S.C. 154(b) by 0 days.

(21) Appl. No.: 14/891,651

(22) PCT Filed: Jun. 16, 2014

(86) PCT No.: PCT/IB2014/001179
§ 371 (c)(1),
(2) Date: Nov. 16, 2015

(87) PCT Pub. No.: WO2014/203073
PCT Pub. Date: Dec. 24, 2014

(65) Prior Publication Data
US 2016/0095463 A1    Apr. 7, 2016

(30) Foreign Application Priority Data

Jun. 17, 2013    (IT) .............................. VE2013A0029

(51) Int. Cl.
*A47J 31/44*    (2006.01)
*B30B 1/04*    (2006.01)
(Continued)

(52) U.S. Cl.
CPC ............... *A47J 31/44* (2013.01); *A47J 31/08* (2013.01); *A47J 31/18* (2013.01); *B30B 1/04* (2013.01); *B30B 11/04* (2013.01)

(58) Field of Classification Search
CPC ......... B30B 11/04; B30B 1/04; B30B 15/302; A47J 31/42; A47J 31/08; A47J 31/18; A47J 31/44
(Continued)

(56) References Cited

U.S. PATENT DOCUMENTS 2,570,989 A * 10/1951 Seelig ...................... B22F 3/03
164/80
3,561,054 A *  2/1971 Smith ................... B30B 15/302
425/168
(Continued)

FOREIGN PATENT DOCUMENTS

WO    WO2008081238 A2    7/2008
WO    WO2012045112 A1    4/2012

*Primary Examiner* — Jimmy T Nguyen
(74) *Attorney, Agent, or Firm* — Themis Law

(57) ABSTRACT

A device for pressing coffee powder includes a lowerly open first hollow cylinder body having a presser element housed therein which has a lowerly open but upperly closed second hollow cylinder body with an annular flange at a lower edge, a pressing member slidable within the second hollow cylindrical body and having a head which emerges from the base aperture of the second hollow cylindrical body, and a biasing member housed within the presser element and acting on the pressing member to maintain the pressing head spaced from the annular flange when the pressing device is not in use, the biasing member being compressed during coffee pressing by the pressing head, an arm causing the presser element to descend relative to the first hollow cylindrical body, the pressing member having a transverse pin with a roller guided along a helical groove defined in the lateral surface of the presser element.

4 Claims, 4 Drawing Sheets

(51) Int. Cl.
  *B30B 11/04* (2006.01)
  *A47J 31/08* (2006.01)
  *A47J 31/18* (2006.01)
(58) Field of Classification Search
  USPC .......................................................... 100/266
  See application file for complete search history.

(56) References Cited

U.S. PATENT DOCUMENTS

| | | | |
|---|---|---|---|
| 4,377,376 A * | 3/1983 | De Santis | B30B 11/04 264/39 |
| 2012/0048120 A1 | 3/2012 | Gillaspie | |

\* cited by examiner

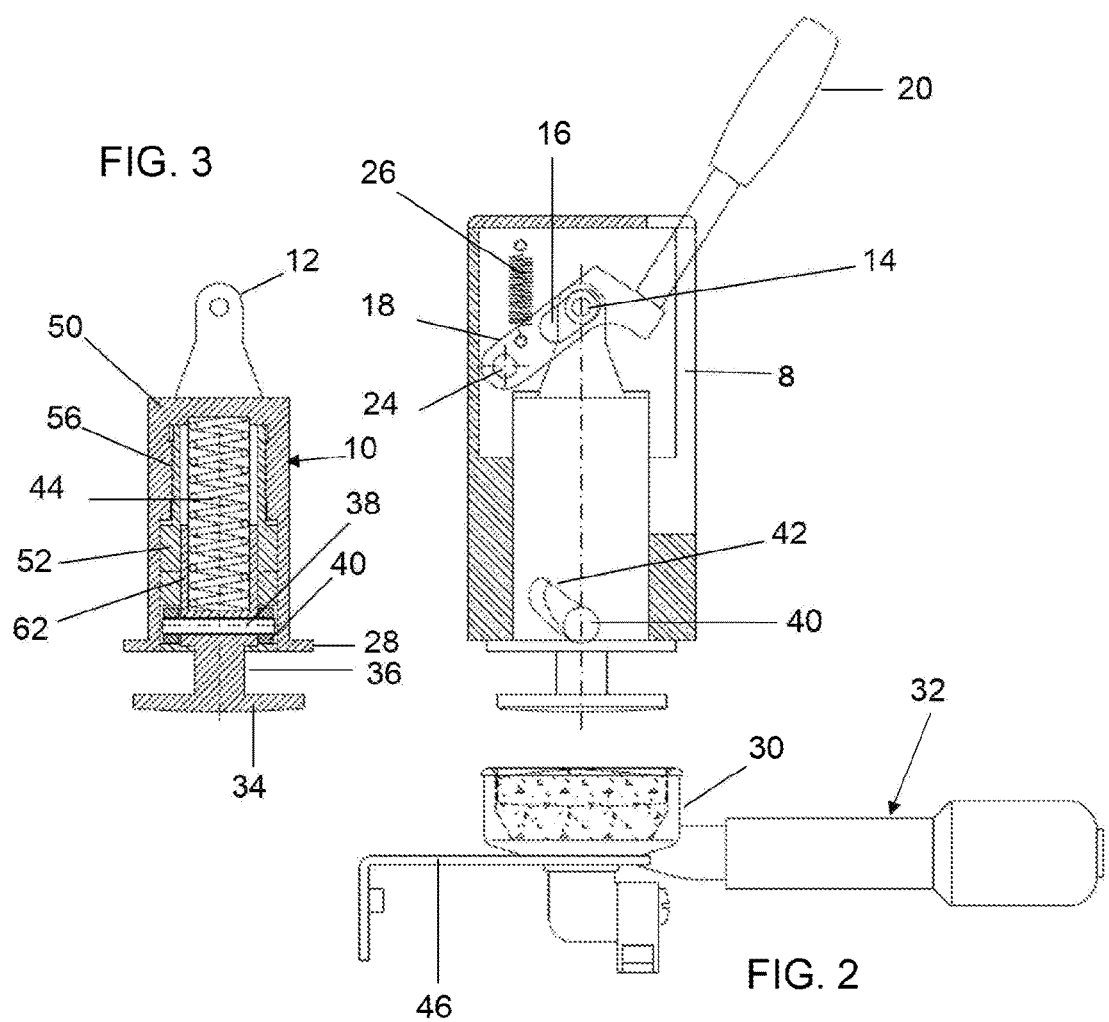

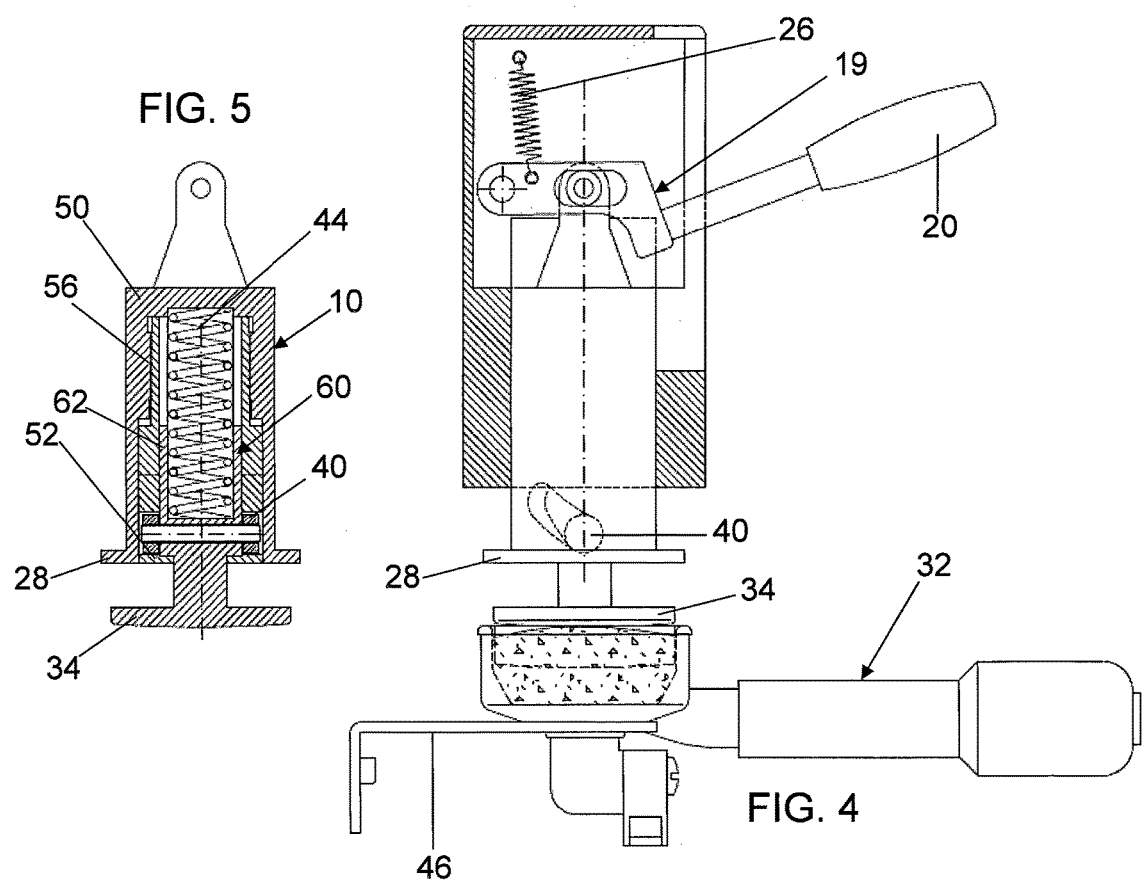

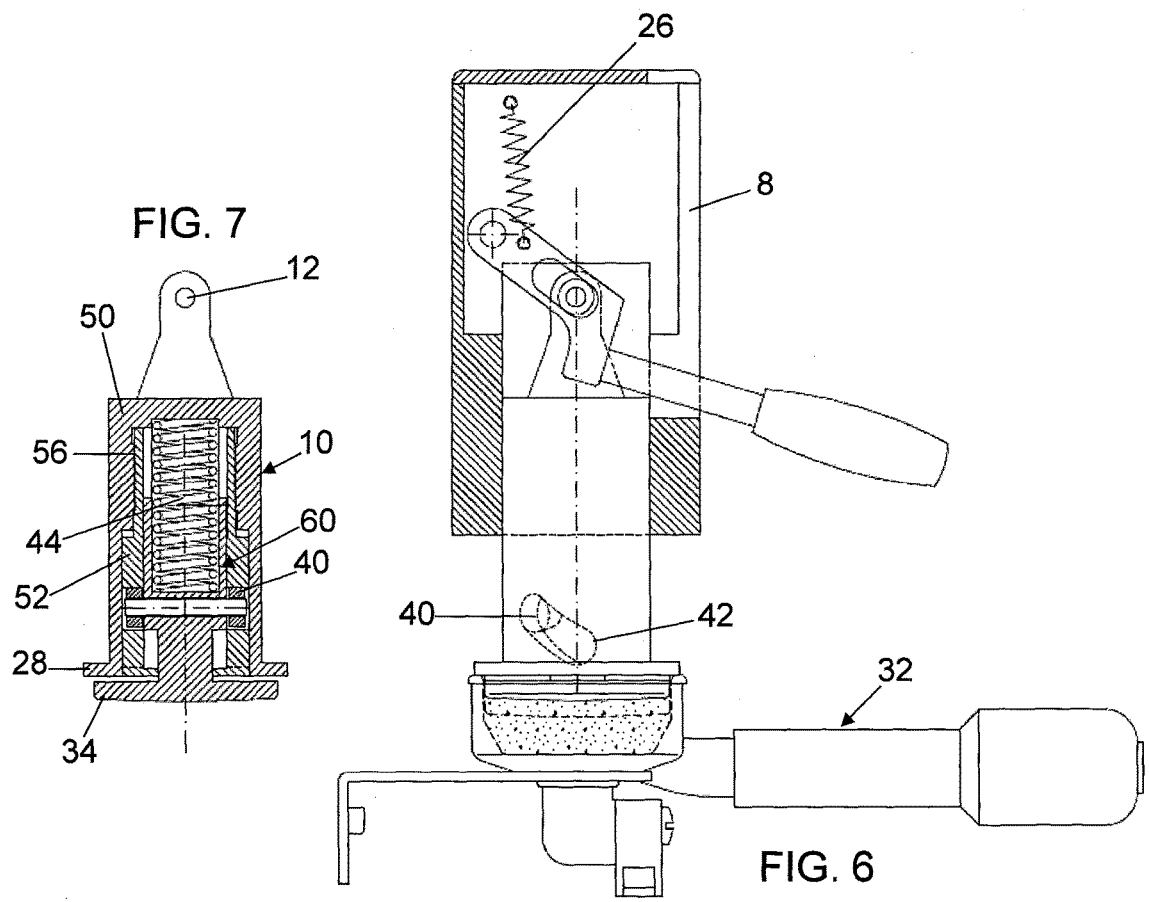

DEVICE FOR PRESSING THE COFFEE POWDER WITHIN THE FILTER HOLDER

FIELD OF THE INVENTION

The present invention relates to a device for pressing the coffee powder within the filter holder.

BACKGROUND OF THE INVENTION

Currently the coffee powder dispensed by the grinder-dispenser in a predetermined quantity into the filter holder is pressed by the operator by pressing it against a suitable disc rigid with the grinder-dispenser or by a manual presser.

This pressing system has however the drawback of not ensuring constant coffee compaction, as it depends on the manual skill of the operator.

Devices have also been proposed which during pressing rotate the coffee in order to amalgamate it into the cup of the filter holder. However these devices have the drawback of constructional complexity.

SUMMARY OF THE INVENTION

An object of the invention is to eliminate these drawbacks by providing a device which enables the coffee powder contained in the filter holder to be subjected to constant pressing.

Another object of the invention is to provide a device which enables the coffee to be amalgamated in a simple and comfortable manner.

BRIEF DESCRIPTION OF THE DRAWINGS

The present invention is further clarified hereinafter with reference to the accompanying drawings, in which:

FIG. 2 is a schematic section through the device in its configuration when not in use, FIG. 3 shows the presser element in this configuration, FIG. 4 shows the device at the commencement of pressing, FIG. 5 shows a section through the presser element in this configuration, FIG. 6 shows the pressing device on termination of pressing, and FIG. 7 shows a section through the presser element in this configuration.

DETAILED DESCRIPTION OF EMBODIMENTS OF THE INVENTION

Figure 1:
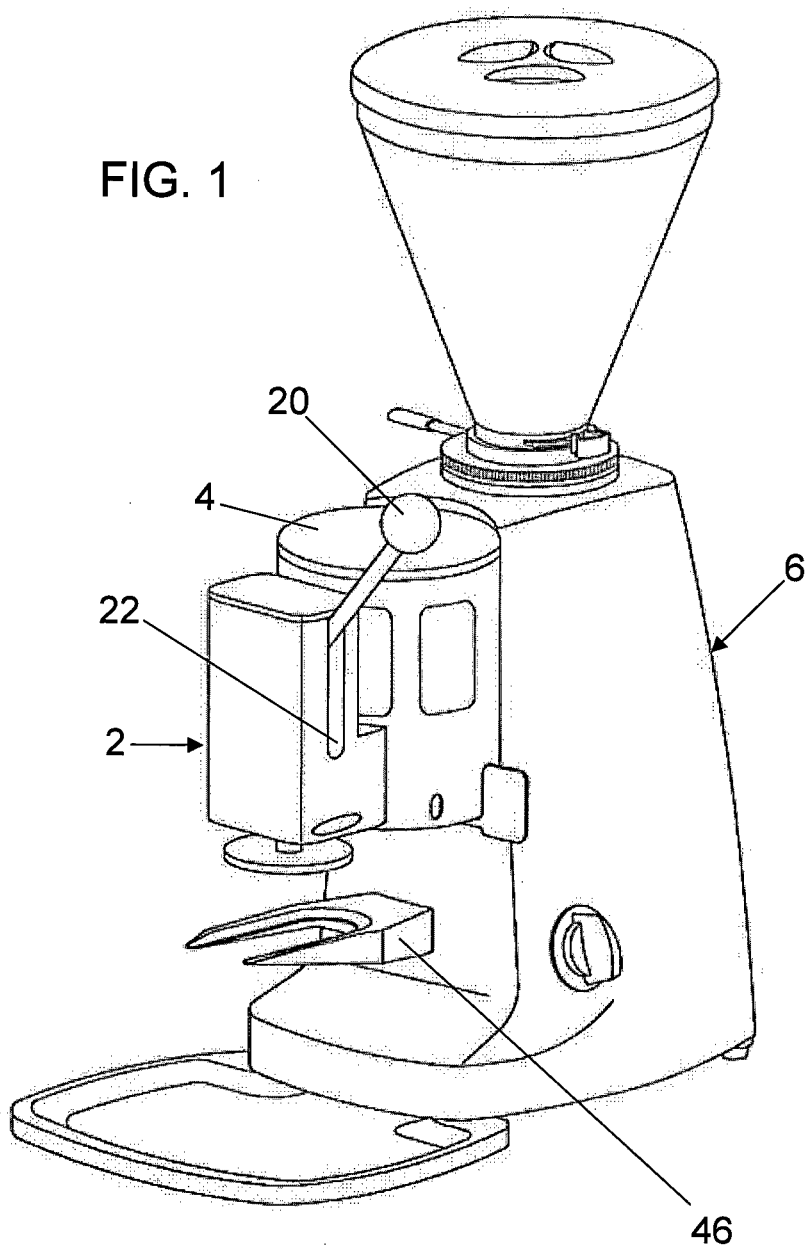
FIG. 1 shows the device according to the invention in perspective view applied to a grinder-dispenser apparatus.

As can be seen from the figures, the manual coffee pressing device according to the invention, indicated overall by 2, is mounted on the ground coffee container 4 rigid with a grinder-dispenser 6 provided with a filter holder support 46.

In other cases, the device can be separate from the grinder-dispenser and mounted on a column with its base provided with a filter holder support.

In particular, the device 2 comprises an upwardly open hollow cylindrical body 8 provided in its interior with a presser element indicated overall by 10.

The presser element 10 presents upperly a drilled appendix 12 in which a pin 14 engages and also engages in a slotted hole 16 provided in an arm 18 of a lever 19, the other arm 20 of which emerges from the cylindrical body through an aperture 22 provided in its lateral surface.

The arm 18 is pivoted to the cylindrical body 8 on a pin 24 and is provided with a coil spring 26, the other end of which is fixed to the cylindrical body 8.

The presser element 10 is also in the shape of a cylinder with its lower end open, where it is provided with a circumferential flange 28 of diameter D1, which is greater than the diameter of the cup 30 of the filter holder 32. The circumferential flange 28 also has a diameter greater than the inner diameter of the lower opening of the hollow cylindrical body 8.

The presser element 10 consists of an outer cylindrical body 50 to which an inner cylindrical body 52 is rigidly fixed by means of a thread 56.

A coiled spring 44 is inserted between the bodies 50 and 52 to act on a pressing member 60 consisting of a stem 62 to which a discoidal pressing head 34 is removably connected having a diameter D2 less than the diameter of the cup 30 of the filter holder 32. It follows that the diameter of the flange 28 is greater than the diameter D2 of the head 34.

This removability of the head 34 enables it to be changed on the basis of the different diameters of the commercially available cups 30 for the filter holder 32.

The stem 62 is provided with a transverse pin 38, the ends of which are provided with two rollers 40 engaging in two helical grooves 42 provided in the lateral surface of the presser element 10.

When the pressing device is not in use, the coil spring 44 elastically maintains the discoidal head 34 spaced from the annular flange 28, in which configuration the rollers 40 are disposed in the lower part of the helical grooves 42.

The pressing device operates in the following manner.

The filter holder 32 is positioned on the support 46 with the cup 30, filled with a measure of coffee powder, facing the pressing head (see FIG. 2).

The arm 20 of the lever 19 is then rotated downwards such as to cause the presser element 10 to descend until the discoidal pressing head 34 rests on the coffee powder (see FIG. 4) and is housed within the cup 30 of the filter holder 32.

As the filter holder 32 is fixed, continuing to rotate the arm 20 causes the discoidal pressing head 34 and the stem 62 to rise within the presser element 10 as they encounter opposition by compression of the coffee, against the elastic reaction exerted by the coil spring 44.

During this rise, the discoidal pressing head 34 is rotated axially following the rise of the rollers 40 within the helical grooves 42.

When the presser element 10 rests with the annular flange 28 on the cup 30 of the filter holder 32, the discoidal pressing head 34 and the stem 62 have undergone their maximum upward stroke and completed axial rotation, to achieve a determined load proportional to the elastic constant of the coil spring 44 (see FIG. 6).

The coil spring 44 is provided with preloading means (not represented in the drawings) to obtain an adjustable elastic response.

On releasing the arm 20 of the lever 19, the elastic reaction of the spring 26 returns the arm 18 of the lever 19 into its initial configuration, with the presser element 10 consequently ready for a new pressing operation.

In a modified embodiment, not represented in the drawings, the spring is replaced by a gas.

From the aforegoing it is apparent that the pressing device of the invention enables pressing of the coffee powder contained in the cup to be conducted in a constant manner.

The invention claimed is:
1. A device for pressing coffee powder, the device comprising:
 a lowerly open first hollow cylinder body (8),
 a presser element (10) housed within said first hollow cylindrical body (8) and consisting of a lowerly open but upperly closed second hollow cylinder body, its lower edge being provided with an annular flange (28) having an outer diameter,
 a pressing member (60) slidable vertically within said second hollow cylindrical body,
 a pressing head (34) of the pressing member which emerges from a base aperture of said second hollow cylindrical body, said pressing head having a diameter smaller than the outer diameter of the annular flange,
 elastic means (44) housed within said presser element (10) and acting on said pressing member (60) to maintain the pressing head (34) spaced from the annular flange (28) when the pressing device is not in use, said elastic means (44) being subjected to compression during coffee pressing by the pressing head (34),
 means (18) for causing said presser element (10) to descend vertically relative to said first hollow cylindrical body (8),
 the pressing member (60) being provided with a pin (38) positioned transverse to a longitudinal axis of the presser element (10), the pin being provided at its ends with at least one roller (40), wherein the at least one roller is guided along a helical groove (42) provided in a lateral surface of the presser element (10).

2. The device as claimed in claim 1, wherein the annular flange (28) is of greater diameter than an inner diameter of a lower aperture of the first hollow cylindrical body (8).

3. The device as claimed in claim 1, wherein the elastic means consist of a coil spring (44).

4. A The device as claimed in claim 1, wherein the pressing head (34) is rigid with but removable from the presser element (10).

* * * * *